(12) United States Patent
Nagpal et al.

(10) Patent No.: US 10,735,690 B2
(45) Date of Patent: *Aug. 4, 2020

(54) SYSTEM AND METHODS FOR PHYSICAL WHITEBOARD COLLABORATION IN A VIDEO CONFERENCE

(71) Applicant: Blue Jeans Network, Inc., Mountain View, CA (US)

(72) Inventors: Ashish Nagpal, Bengaluru (IN); Alagu Periyannan, Palo Alto, CA (US); Navneet Kumar, Bengaluru (IN)

(73) Assignee: Blue Jeans Network, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/404,457

(22) Filed: May 6, 2019

(65) Prior Publication Data

US 2019/0260964 A1    Aug. 22, 2019

Related U.S. Application Data

(63) Continuation of application No. 15/788,629, filed on Oct. 19, 2017, now Pat. No. 10,284,815.

(30) Foreign Application Priority Data

Jul. 26, 2017    (IN) .............................. 201731026552

(51) Int. Cl.
*H04N 7/14*    (2006.01)
*H04L 12/18*    (2006.01)
(Continued)

(52) U.S. Cl.
CPC ............. *H04N 7/147* (2013.01); *G06F 3/048* (2013.01); *H04L 12/1822* (2013.01); *H04L 65/403* (2013.01); *H04L 65/4015* (2013.01); *H04N 7/152* (2013.01); *H04L 65/1006* (2013.01); *H04L 65/608* (2013.01)

(58) Field of Classification Search
USPC ...................................................... 348/14.03
See application file for complete search history.

(56) References Cited

U.S. PATENT DOCUMENTS

| 2003/0021447 A1* | 1/2003 | Ott ........................... | G06K 9/38 382/112 |
| 2007/0126755 A1* | 6/2007 | Zhang ...................... | H04N 5/77 345/619 |

(Continued)

FOREIGN PATENT DOCUMENTS

EP    1564682 A2    8/2005

OTHER PUBLICATIONS

International Search Report and Written Opinion dated Oct. 4, 2018, from the ISA/European Patent Office, for International Patent Application No. PCT/US2018/043639 (filed Jul. 25, 2018), 15 pages.

(Continued)

*Primary Examiner* — Amal S Zenati
(74) *Attorney, Agent, or Firm* — Ascenda Law Group, PC (57) ABSTRACT

A video conferencing may include a virtual whiteboard for displaying annotations and streaming of a physical whiteboard, indexing of physical whiteboard content, and compositing and projection of remote whiteboard content onto a local whiteboard.

7 Claims, 8 Drawing Sheets

(51) Int. Cl.
  *H04L 29/06* (2006.01)
  *G06F 3/048* (2013.01)
  *H04N 7/15* (2006.01)

(56) References Cited

U.S. PATENT DOCUMENTS

| | | |
|---|---|---|
| 2012/0113238 A1 | 5/2012 | Yamamoto et al. |
| 2012/0280948 A1* | 11/2012 | Barrus ................ G06F 3/04883 345/179 |
| 2013/0033679 A1 | 2/2013 | Mukasa |
| 2014/0118314 A1* | 5/2014 | Black .................. G06F 3/03545 345/179 |
| 2014/0149880 A1 | 5/2014 | Farouki |
| 2015/0271446 A1* | 9/2015 | Browne .............. H04L 12/1827 348/14.08 |
| 2019/0004622 A1* | 1/2019 | O'Brien ................ G06F 3/011 |

OTHER PUBLICATIONS

International Preliminary Report on Patentability dated Feb. 6, 2020, from the International Bureau of WIPO, for International Application No. PCT/US2018/043639 (filed Jul. 25, 2018), 10 pages.

* cited by examiner

SYSTEM AND METHODS FOR PHYSICAL WHITEBOARD COLLABORATION IN A VIDEO CONFERENCE

CROSS REFERENCE TO RELATED APPLICATIONS

This application is a Continuation Application of U.S. application Ser. No. 15/788,629, filed on 19 Oct. 2017 (now issued as U.S. Pat. No. 10,284,815), which claims the priority benefit of Indian Application No. 201731026552, filed on Jul. 26, 2017, each of which is incorporated by reference herein.

FIELD OF THE INVENTION

The present invention is directed to providing a video conference system involving a virtual whiteboard or one or more physical whiteboard streams.

BACKGROUND

Groups collaborating on a project often write or sketch out ideas on a whiteboard while brainstorming or otherwise communicating about the project. Additionally, sometimes the members of the group are situated in different geographic locations. While video conferencing can aid in allowing disparate members of a group to participate in meetings by sharing audio and video of participants as they speak, conventional video conferencing approaches do not accommodate freeform written communications, such as whiteboard sketches.

Systems and methods for integrating whiteboard-based communication into a video conference are described herein.

SUMMARY

Embodiments are described for provision of video conferencing involving representations of whiteboards. In some embodiments, a point of presence (POP) accepts a plurality of audio and video streams from a plurality of video-conference endpoints. The POP further accepts a first physical-whiteboard stream generated based on a sequence of images of a first physical whiteboard. The POP enables a virtual whiteboard incorporating the first physical-whiteboard stream and provides a representation of the changing appearance of the virtual whiteboard as a virtual whiteboard stream to the plurality of video-conference endpoints. The POP or a computing device may index the first physical-whiteboard stream by associating handwritten or hand-drawn content with a plurality of corresponding recognized objects. In some embodiments, the POP additionally accepts a second physical-whiteboard stream associated with a second physical whiteboard, and provides a first projector stream to a first projector endpoint associated with the first physical whiteboard, the first projector stream based on the second physical-whiteboard stream, wherein the virtual-whiteboard stream comprises a composite of the first physical-whiteboard stream and the second physical-whiteboard stream.

BRIEF DESCRIPTION OF THE DRAWINGS

FIG. 9 shows a block diagram of an exemplary computing system in accordance with some embodiments of the invention.

DETAILED DESCRIPTION

Embodiments of apparatuses, computer systems, computer readable mediums, and methods for a video conference system involving whiteboards are described. In some embodiments, a virtual whiteboard is used to display the content of one or more whiteboards at endpoints of the conference. In certain embodiments, the virtual whiteboard additionally displays annotations provided by participants in the conference via endpoint devices. In certain embodiments, the content shown on a physical whiteboard is displayed to remote participants via a virtual whiteboard stream. In certain embodiments, projectors are used to present remote content on two or more physical whiteboards, where the remote content is the captured content from other whiteboards. Accordingly, physical content on a physical whiteboard may be shared with another physical whiteboard, allowing geographically distributed collaboration on a physical whiteboard. In certain embodiments, remote content includes annotations submitted to or created in the virtual whiteboard. In certain embodiments, the physical content written on the whiteboards is indexed and stored in a database or shared as meeting notes for easy summarization and retrieval.

The video conference system may support a variety of video conferencing feeds of audio, video, audio and video, and/or other media data streams from video conferencing participant endpoints to present a video conference. Endpoints may be any type of device, including, but not limited to: laptops, computers, smartphones, tablets, phones, audio and video conferencing system devices, and/or any other device capable of sending and receiving data streams over a network. Participants may use proprietary or standards-based communication protocols with their devices, and the video conference system may enable a multi-party and/or point-to-point (e.g., between two endpoints) video conference session among the plurality of participant endpoints.

These interactions encompass the control of a video conference session, its configuration, the visual layout of the data streams from the conference participants, customization of the user interface, and adaptation of a video conference to integrate with and present data streams from different client applications (e.g., chat, whiteboards, Microsoft Skype, etc.). For a non-limiting example, one such use of the video conference system is to facilitate conferences between two disparate endpoints such as a client application for a proprietary system from a communication service provider (e.g., a Skype client) and an application for a standards-based H.323 endpoint. Continuing with the example, the Skype user may initiate a video conference with another user and have no knowledge of the other user's endpoint technology (e.g., client application), and the video conference system may host a video conference session and instantiate media processing components/elements to translate data streams (as needed), transcode data streams (as needed), and create a composite of data streams received from the disparate endpoints.

Figure 1:
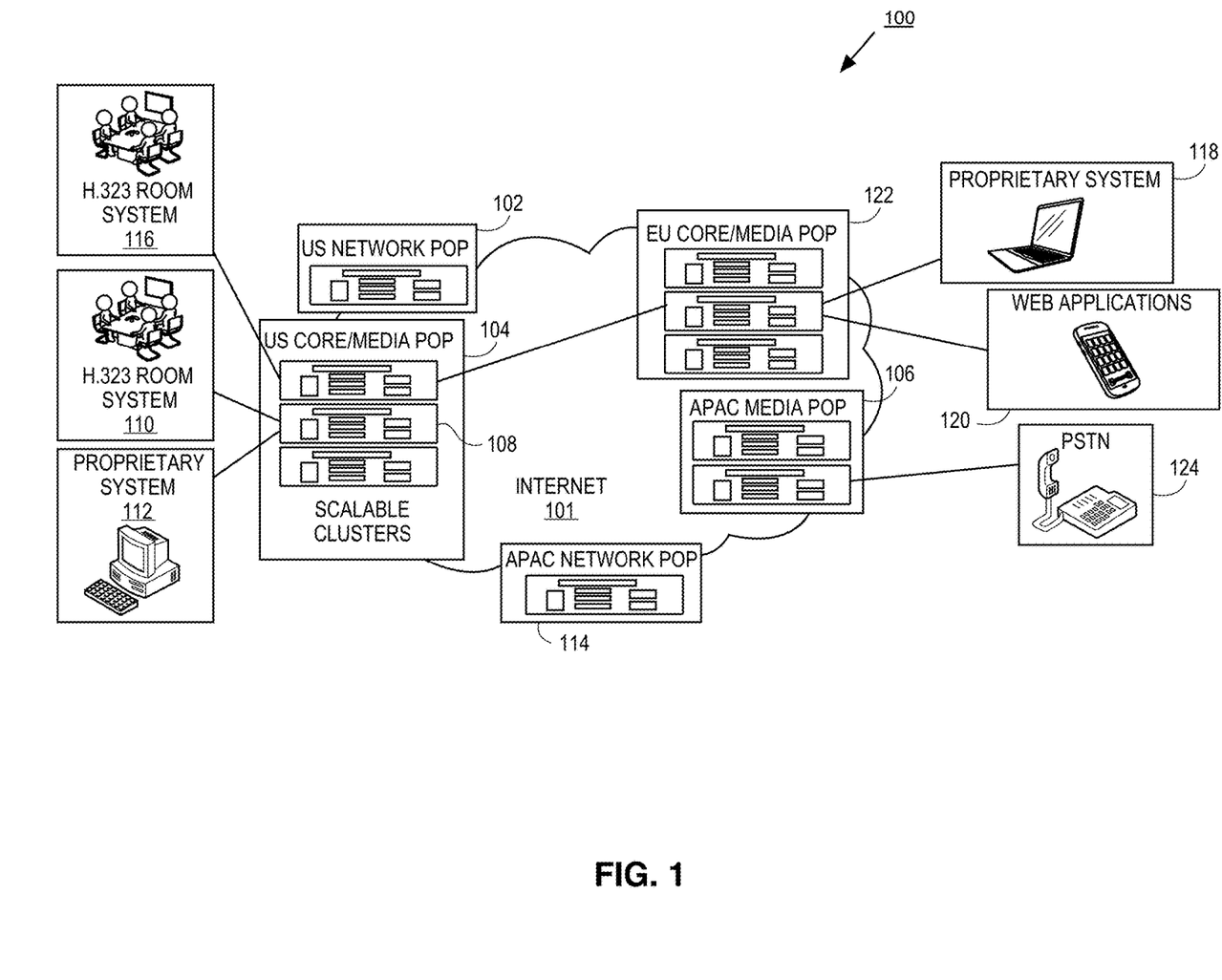
FIG. 1 depicts an exemplary video conferencing system in accordance with some embodiments of the invention.

FIG. 1 depicts an exemplary video conferencing system 100, in accordance with some embodiments of the invention. The video conferencing system 100 may include one or more points of presence (POPs—e.g., POPs 102, 104, 106, and 114). The POPs may be respectively organized to comprise scalable clusters of nodes, such as media processing nodes 210, as described in connection with FIG. 2 below. Media processing nodes are used to process and compose video conference feeds from various endpoints (e.g., 116, 10, 112, 118, 120, and 124). In certain embodiments, media processing nodes are multipoint control units (MCUs). In certain embodiments, the media processing nodes associated with a POP may work together (and, in some embodiments, work with other POP components) to collectively function as a MCU. In some embodiments, a clustered design makes use of network layer multicast and a multi-bit-rate stream distribution scheme to allow scaling. In certain embodiments, media processing nodes may be implemented with off-the-shelf components, such as Linux/x86 Central Processing Units (CPUs) and PC Graphics Processing Units (GPUs) instead of custom hardware. MCUs based on clusters of media processing nodes can be deployed in a rack-and-stack cloud-computing style and hence achieve the a scalable and cost/performance-efficient approach to support a video conferencing service. Video conferencing system 100 may be used for media stream distribution processing that may be achieved locally on a Local Area Network (LAN) present in each POP and/or across multiple POPs on the Wide Area Network (WAN).

In some embodiments, video conferencing system 100 may be implemented with clusters of x86 servers (e.g., server 108) both locally on a LAN as well as across geographies serving as the media processing nodes for the MCUs to achieve near unlimited scaling. Endpoints may be, for example, room systems running H.323 (as shown with 110), PCs running H.323, PCs or mobile devices running Skype or Microsoft Lync (as shown with 112).

By way of a non-limiting example, video conferencing system 100 has the media processing node MCUs distributed around the globe in POPs (e.g., United States (US) Network POP 102, US Core Media POP 104, Asia Pacific (APAC) Media POP 106, APAC Network POP 114, and European Union (EU) Core Media POP 122) at data centers (e.g., third party data centers) to process video conference feeds coming from video conference endpoints having different communication protocols and/or using different client applications from communication service providers.

In some embodiments, the video conferencing system 100 may have multiple other globally distributed private networks to connect to it, including, but not limited to, deployments of video conferencing services such as Microsoft Lync that require federation (i.e. cooperation among multiple organizational entities) at edge nodes and translation and decoding of several communication and transport protocols.

Figure 2:
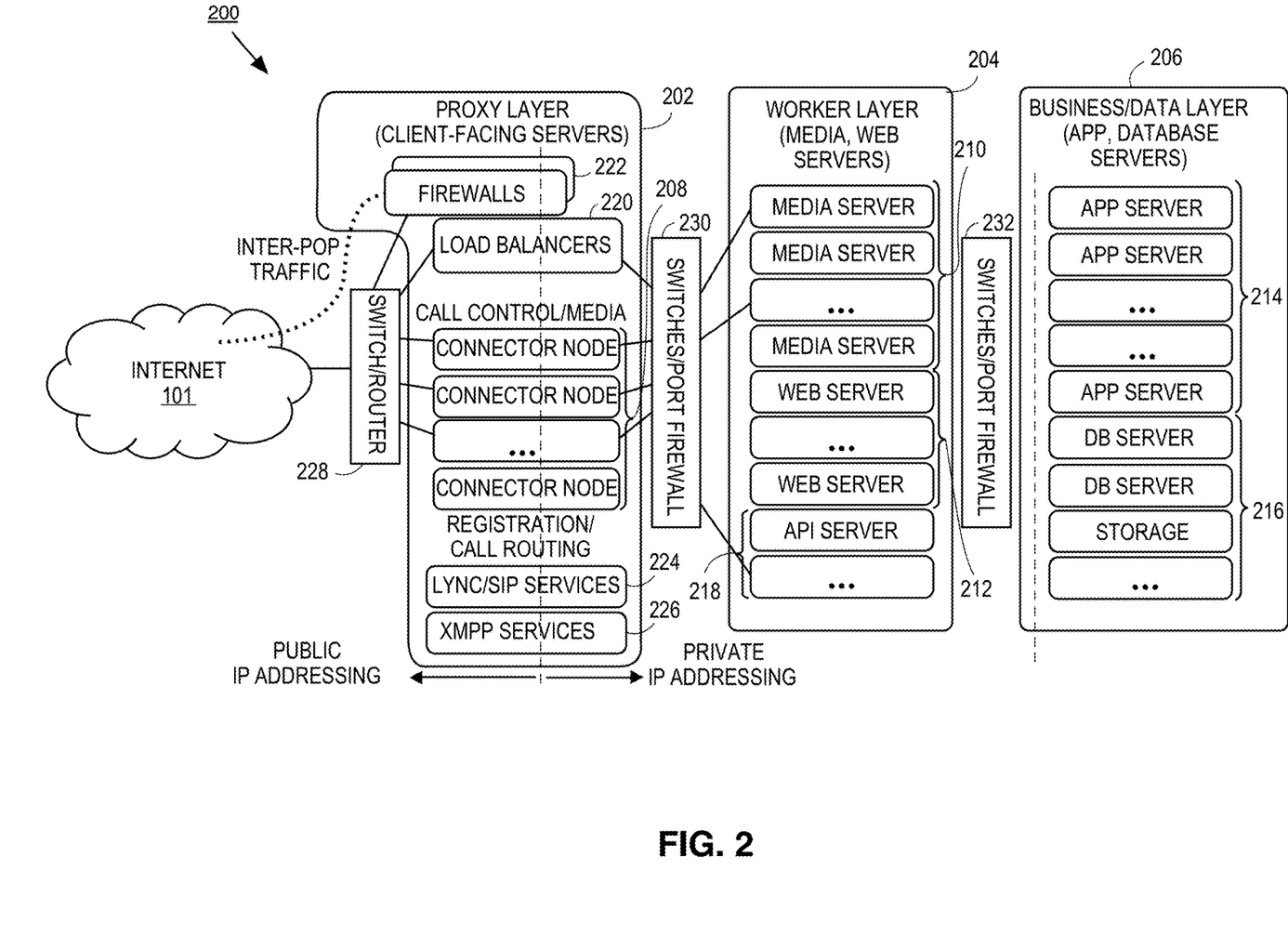
FIG. 2 depicts an exemplary POP media processing node architecture in accordance with some embodiments of the invention.

FIG. 2 depicts an exemplary POP media processing node architecture 200 (e.g., architecture for POPs 102, 104, 106, 114, and 122) accessible over a network 101 with a Proxy Layer 202, a Worker Layer 204, and a Business/Data Layer 206. Some of the components/elements of the POP 200 include but are not limited to, the following: load balancers 220, firewalls 222, media processing nodes (media servers) collectively 210 for processing data streams (e.g., transcoding, compositing, mixing and/or echo cancellation among H.26x, G.7xx, and SILK), protocol connector nodes collectively 208 for handling call and/or media processing control for endpoints of video conference (e.g., for H.323, Skype, SIP, XMPP, and NAT traversal), servers for handling particular communication services or protocols (e.g., LYNC, SIP services 224, and XMPP services 226), web servers collectively 212, application programming interface (API) servers 218, data storage collectively 216 (e.g., database (DB) servers and other storage), and applications servers collectively 214 for supporting web applications (e.g., for providing functionality to the user, such as conference control, screen and presentation sharing, chat, etc.). The components may be distributed across the nodes and/or POPs of the video conferencing system 100 for enabling real-time or nearly real-time communication. Components may be connected on a network and can communicate over networks utilizing switches and routers as shown with 228, 230, and 232.

Some components, which include, but are not limited to, the following components: user/account management, billing system, NOC (Network operation center) systems for bootstrapping, monitoring, and node management may be run at one or more centralized but redundant management nodes in the Business/Data Layer 206. Other components, which include but are not limited to, common application framework and platform (e.g., Linux/x86 CPUs, GPUs, package management, clustering) can be run on both the distributed nodes and the centralized management nodes.

Each of the protocol connector nodes 208 in the Proxy Layer 202 may receive audio video data streams utilizing proprietary or standards based communication protocols and may translate the received data into a common protocol (e.g., Real Time Transport Protocol (RTP)). The received data in the common protocol may then be sent to media servers for transcoding and composition/mixing by media processing nodes 210 of the Worker Layer 204, with such operation of the media processing nodes 210 used to form composite data streams for the endpoints. Translating (when needed) may include receiving the data packets of a data stream communicated using a first communication protocol and retransmitting the received data packets using a second communication protocol.

In some embodiments, application server 214 (e.g., a user experience engine) renders multimedia content including but not limited to the composite audio/video stream to each of the participants to the video conference via one or more user interfaces.

Figure 3:
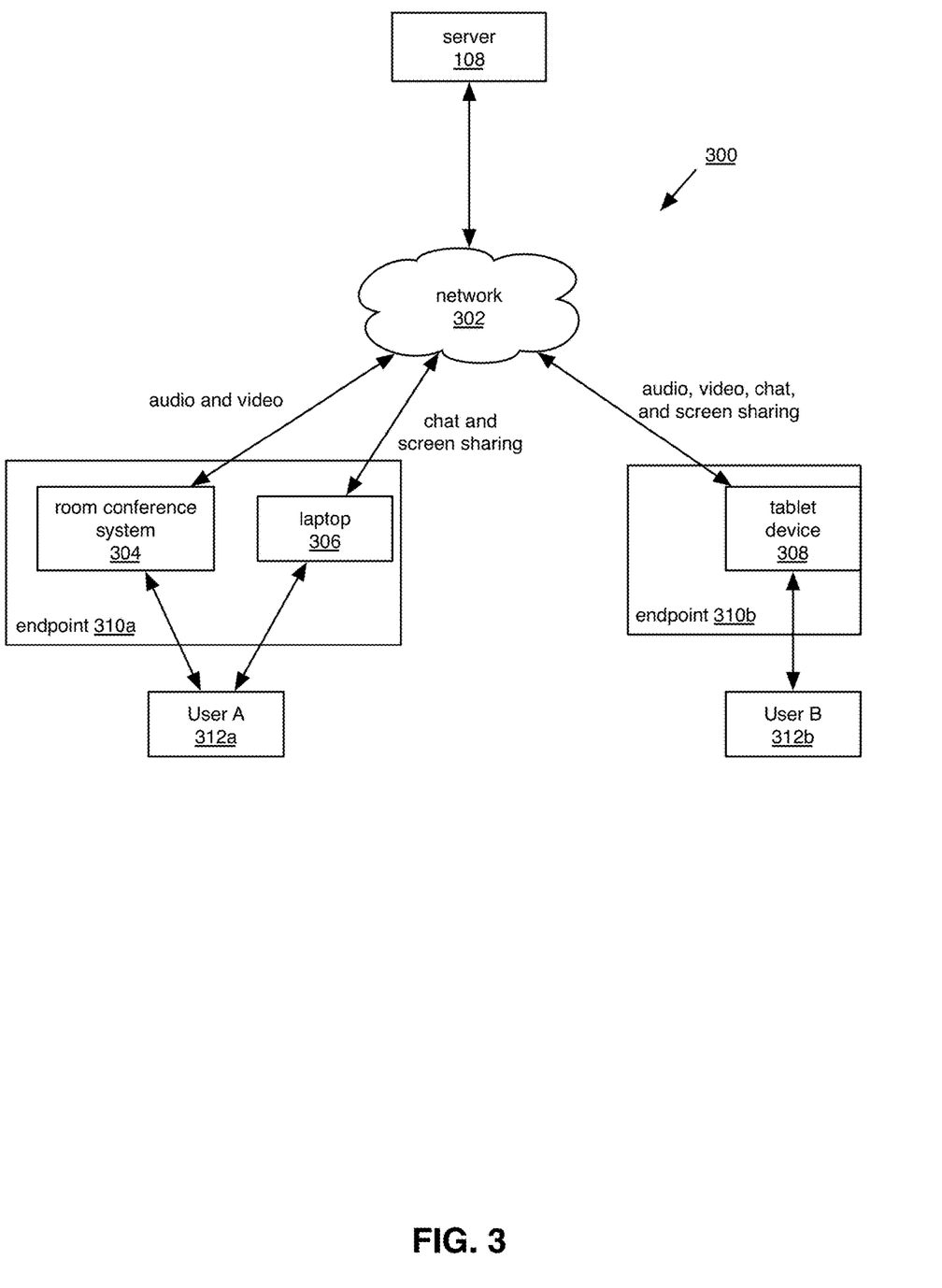
FIG. 3 depicts exemplary components of a video conferencing system in accordance with some embodiments of the invention.

FIG. 3 shows exemplary components of a video conferencing system 300, in which multiple devices may form a single video conference endpoint, each device with its own set of capabilities. A user can join a video conference call with (i) a room conference system that can be used for audio and video, (ii) a tablet device or laptop that can be used for screen sharing, and (iii) a smart phone that can be used for chat, all of these electronic devices forming a single video conference endpoint. In the embodiment shown in FIG. 3, room conference system 304 and laptop 306 are associated as a single endpoint 310a with User A (312a), and tablet device 308 forms a second endpoint 310b associated with User B (312b). In a video conference facilitated by a room conference system with limited capabilities (e.g., no chat possible), a mobile device (e.g., mobile phone, tablet computer, laptop computer, etc.) can be used to supplement the capabilities of the room conference system (e.g., provide chat).

Server 108 may support a set of capabilities, such as audio, video, chat, screen sharing and the like, for each user. A user can join a video conference with a first device that is capable of supporting audio/video and a second device that is better suited for content sharing and chat. Server 108 may associate a first user with both the first and second devices, and consequently can determine the communication modes (i.e., audio, video, content sharing and chat) that are associated with the first user. Server 108 may be a component of video conferencing system 100, such as a server of POP media processing node architecture 200. Network 302 may be a WAN, the internet, a telecommunications network, a LAN, or the like.

In certain embodiments, the user may identify himself/herself at the time of joining a video conference with a device, by pairing the device with another device already joined into the video conference. For instance, after a first user joins a video conference using a first device, server 108 may provide the first user with a short alphanumeric code that can be used to associate any further devices that join the video conference with the first user. That is, the first user can join a second device into the video conference by entering the short alphanumeric code on the second device; the second device may then provide the short alphanumeric code to server 108; and server 108 may then associate both the first and second devices with the first user.

In addition and/or alternatively, pairing may be heuristically determined by the server. For instance, server 108 may detect similar audio signals (e.g., similarity being measured based on the correlation between two signals) being received from a first device and a second device. As such correlation may indicate two devices being used by the same user, server 108 may then associate the first and second devices with the same user (and/or with the same video conference endpoint).

Figure 4:
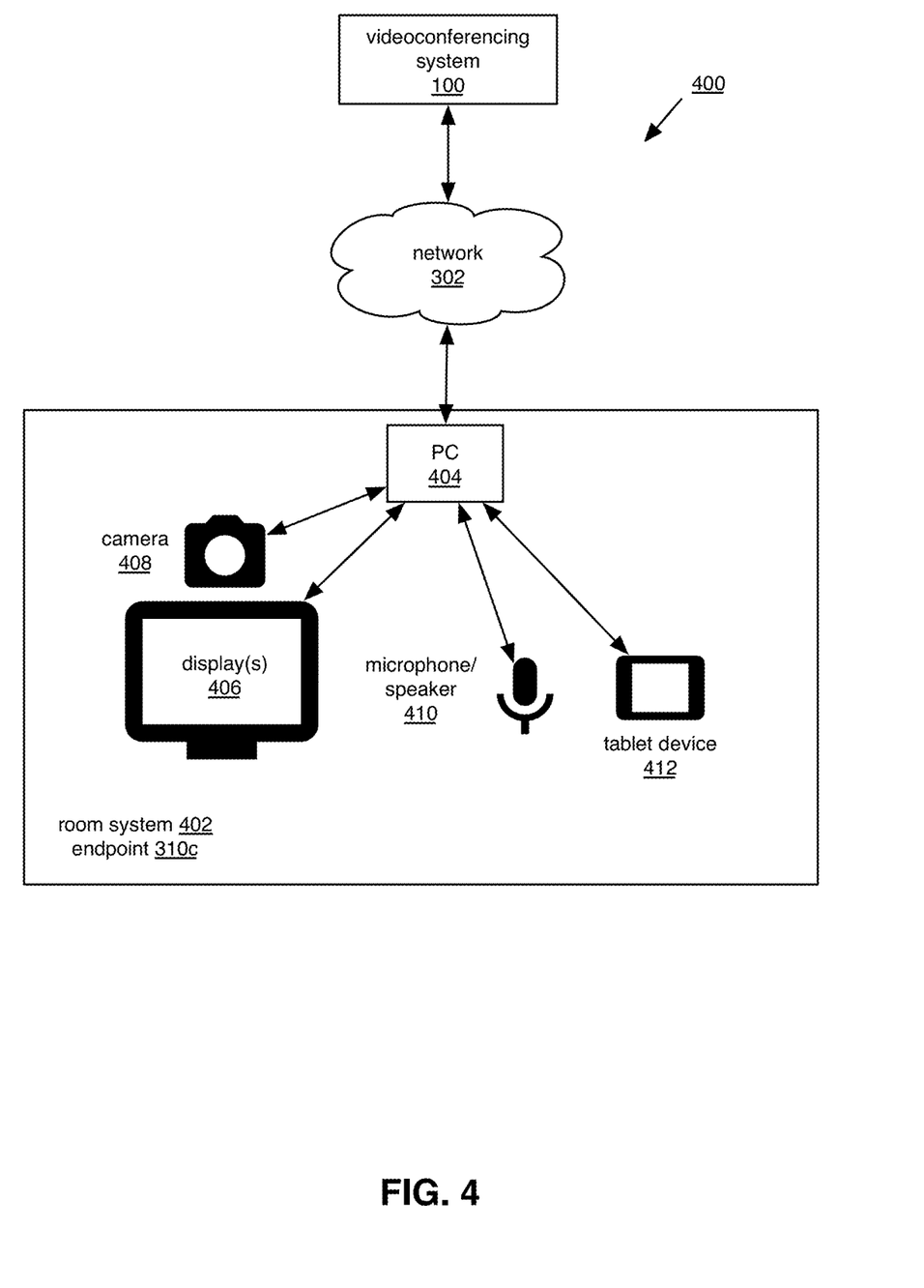
FIG. 4 depicts exemplary components of an exemplary room system endpoint in a video conferencing system in accordance with some embodiments of the invention.

FIG. 4 shows the components of an exemplary room system endpoint 310c in a video conferencing system 400. Room system 402, functioning as an endpoint 310c, may comprise a personal computer 404, one or more displays 406, a camera 408, a microphone and speaker 410, and a tablet device 412. Personal computer 404 may act as a hub for mediating data communications between some or all of the components of the room system endpoint 310c, and may be, for example, a small form-factor computer such as a Mac Mini or an Intel NUC (Next Unit of Computing) computer. Displays 406 may be a television, a monitor, or a projector and projector screen or white board. The microphone and speaker may be contained in a single device or multiple devices; in certain embodiments, the room system 402 may include multiple microphones and speakers. Tablet device 412 (alternatively, another mobile device such as a smartphone) may provide a user interface for controlling the video conferencing experience at room system 402.

Figure 5:
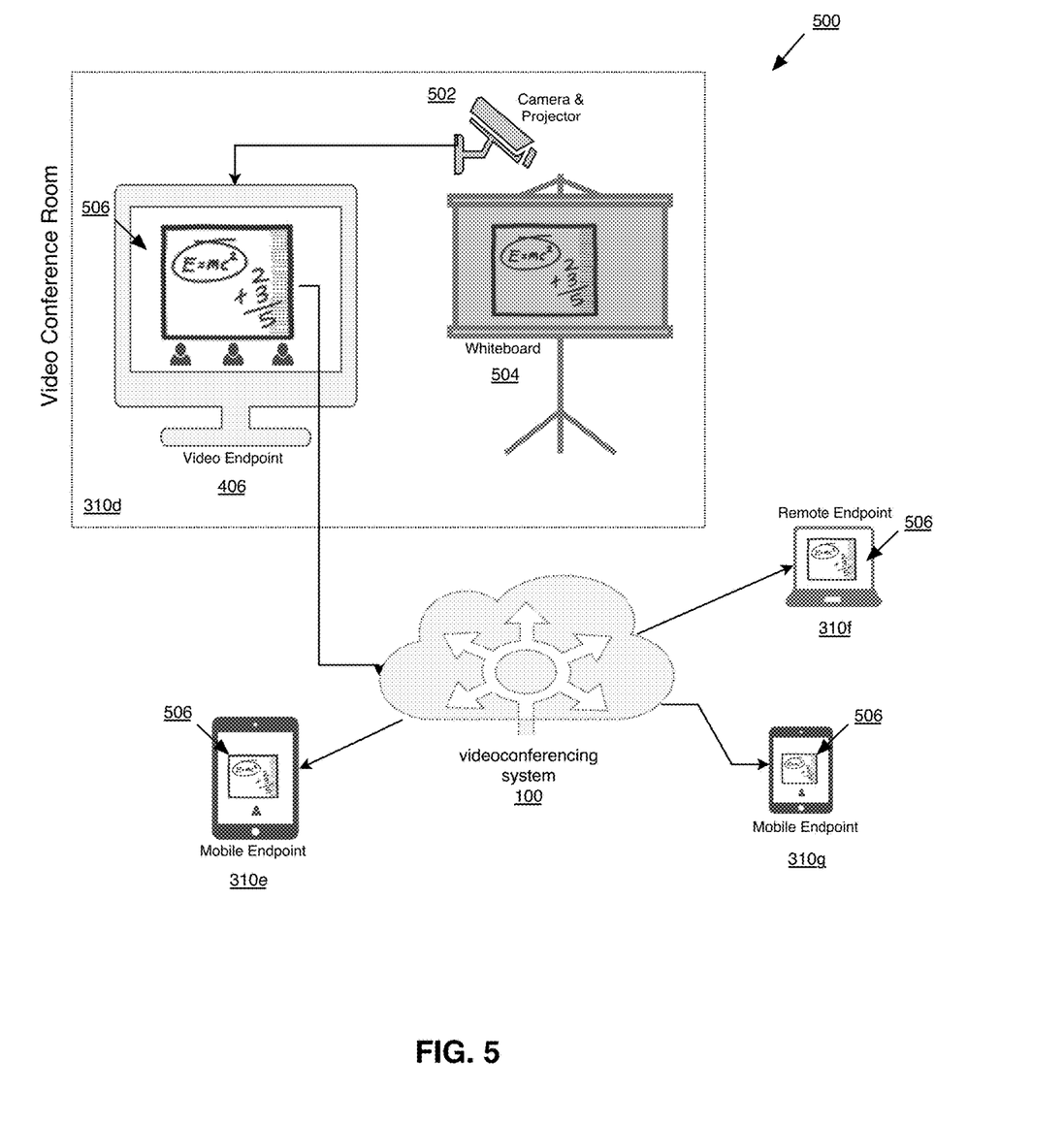
FIG. 5 depicts exemplary components of a video conferencing system in accordance with some embodiments of the invention.

FIG. 5 shows components of an exemplary video conferencing system 500 in which one endpoint 310d includes a room system with a display 406 for presenting a virtual whiteboard as a video endpoint. Devices associated with endpoint 310d may include, for example, a collection of devices within a physical room associated with the endpoint, such as room system 402 components PC 404, camera 408, a microphone and/or speaker 410, and tablet device 412. In certain embodiments, display 406 may be the display of a laptop or tablet computer. The physical room may also contain a physical whiteboard 504. In certain embodiments, physical whiteboard 504 is associated with a camera and projector 502 that is focused on physical whiteboard 504. In certain embodiments, camera/projector 502 are associated with a separate endpoint from the video endpoint of display 406, and in other embodiments, camera/projector 502 and display 406 are associated with the same endpoint 310d. In certain embodiments, camera/projector 502 may be mounted to the physical whiteboard 504, and in other embodiments camera/projector 502 is mounted on a tripod or a wall mount. Physical whiteboard 504 has a surface that can be drawn or written upon using an ink-dispensing pen or other writing implement, in which a physical marking material is applied to the whiteboard surface during use (i.e., freehand writing or drawing on the whiteboard). In some embodiments, whiteboard 504 is a surface that can be wiped clean with a sponge or eraser to remove whiteboard pen ink. In some embodiments, whiteboard 504 is a chalkboard that can be marked up with chalk and erased with a chalkboard eraser. In some embodiments, whiteboard 504 is a large pad of papers, and a paper from the top of the pad is ripped away to "erase" the whiteboard.

Camera/projector 502 is configured to take photos of the surface of whiteboard 504 and to project virtual markings (i.e., not physical markings) onto the surface of whiteboard 504. For example, the projector may be configured to use a light-emitting diode (LED) light source that shines through a small liquid crystal display (LCD) screen into a lens, resulting in the projection of digital content from the LCD onto the physical whiteboard 504. In certain embodiments, camera/projector 502 are two separate devices, and in others, camera and projector are combined in a single device. In certain embodiments, camera/projector 502 includes a processor configured to remove noise from captured image sequences, such as a transient image of a human hand in the act of writing on the physical whiteboard 504. In certain embodiments, camera/projector 502 is in communication with a display 406 via a local PC 404 on a local area network (e.g., using wired (e.g., Ethernet) and/or wireless (e.g., WiFi) connections). In certain embodiments, camera/projector 502 is in communication with a local display 406 via a video conferencing infrastructure such as video conferencing system 100. FIG. 5 shows three remote endpoints—mobile endpoints 310e and 310g, and remote laptop endpoint 310f. As shown in FIG. 5, the three remote endpoints 310e-g are in communication with camera/projector 502 via video conferencing system 100. Displays at each endpoint associated with a video conference (e.g., the respective displays of mobile devices at endpoints 310e and 310g and laptop 310f) may present a virtual whiteboard 506. A virtual whiteboard 506 is a visual representation that is presented via a video conferencing session to two or more endpoints. In certain embodiments, e.g., when the video conference involves sharing of physical whiteboard 504, virtual whiteboard 506 is based on physical whiteboard 504, as explained below.

Digital Annotation on Virtual Whiteboard

Figure 6:
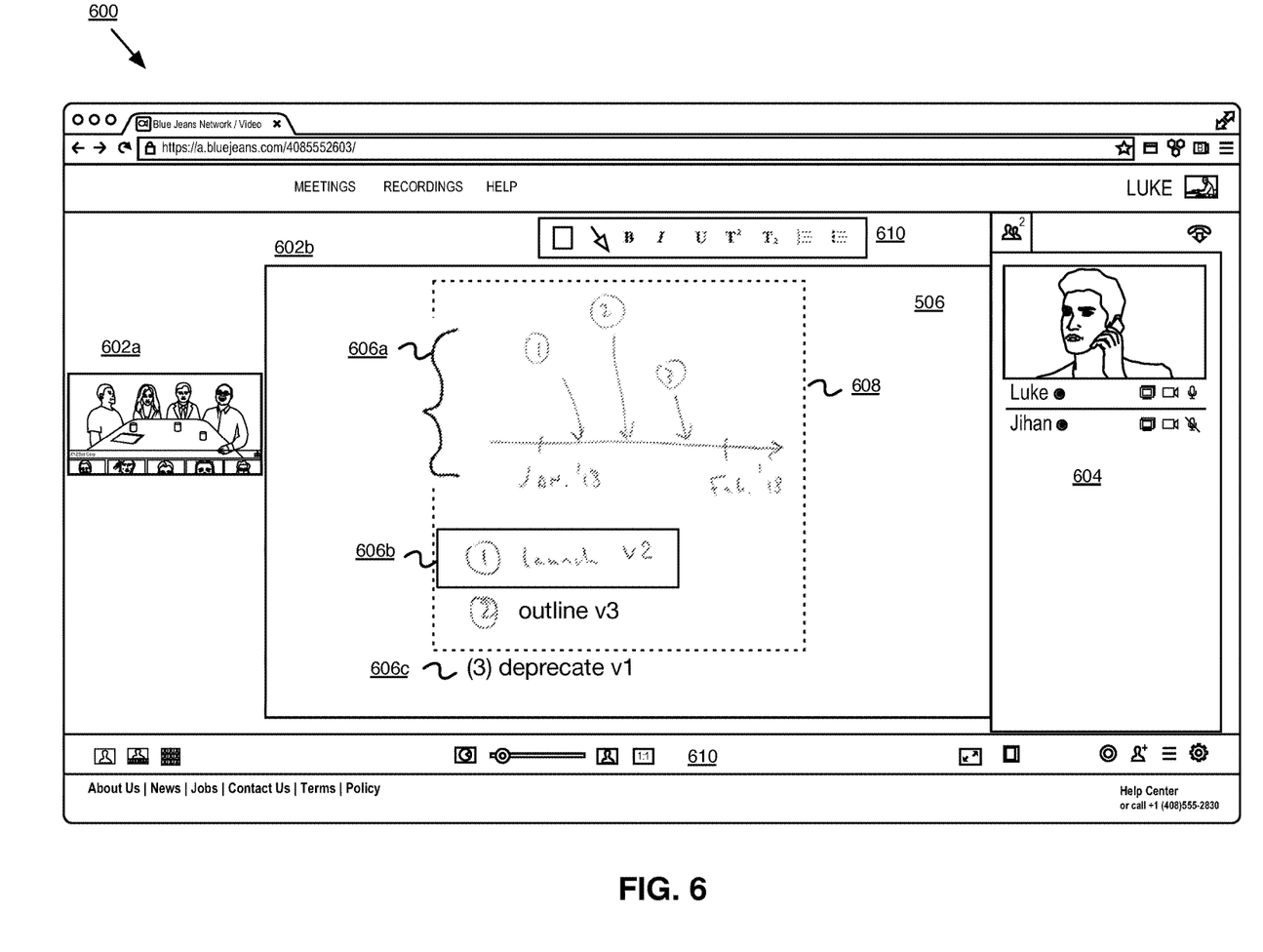
FIG. 6 depicts an exemplary user interface in accordance with some embodiments of the invention.

FIG. 6 shows an exemplary user interface 600 for participating in a teleconference at an endpoint, for example via a display 406. User interface 600 may be an HTML or browser-renderable canvas. User interface 600 may include one or more video streams 602—for example, video stream 602*a*, showing a video aimed at participants at an endpoint (such as room system 310*d*), and video stream 602*b*, showing an exemplary virtual whiteboard 506. User interface 600 may additionally include a panel 604 indicating information about participants to the video conference, and a user interface control 610 for setting the appearance of the video stream layout, such as setting the relative sizes as displayed of categories of video streams (as shown in FIG. 6, a presentation category of stream (e.g., stream 602*b*) is selected to occupy a larger amount of space within the user interface relative to a participant-view category (e.g., stream 602*a*)).

As shown in FIG. 6, virtual whiteboard 506 is displayed, showing various categories of annotations. An annotation 606 is a visually displayable object that was created by a participant of a video conference and is associated with a two-dimensional location and an ordering (e.g., relative to other annotations) within the displayable area of a virtual whiteboard 506. The appearance of certain annotations may be represented using vector descriptions and formatting information such as colors. Certain annotations may include a bitmapped image. In certain embodiments, annotations have additional attributes or metadata such as an identifier for the participant or endpoint who created the endpoint, the annotation type, and a time at which the annotation was created. An annotation may be of a certain type, for example, a static freehand annotation (see, e.g., 606*a* (freehand curly bracket)), a basic shape annotation (e.g., 606*b* (rectangle)), or a text annotation (e.g., 606*c*). In certain embodiments, as described below, an annotation may include a physical whiteboard stream 608 (described below), as distinguished from other embodiments, in which all annotations are static. The default ordering of the annotations 606 within a virtual whiteboard may be set by the order in time that the annotation was created, so that later-in-time annotations may be displayed in front of (or overlaid over) earlier-in-time annotations. In certain embodiments, user interface 600 provides controls for displaying or hiding categories of annotations (e.g., annotations of a specified type or annotations created by a particular participant or endpoint may be displayed or hidden at the local endpoint or all other endpoints).

Annotations may be created by participants, for example by way of a toolbar 610 presented by a user interface at an endpoint, along with selecting the location for the annotation within the virtual whiteboard display area on a device associated with a display presenting the virtual whiteboard. For example, toolbar 610 may include controls for creating and formatting text annotations, freehand markings, and basic shapes. In certain embodiments, a touch-screen display, for example on a tablet computer, may be used to draw with a finger or stylus to create annotations. In certain embodiments, images (e.g., saved to a local storage on an endpoint device) may be placed onto the virtual whiteboard as an annotation. In certain embodiments, certain types of annotations are not included in the representation of the virtual whiteboard unless the creator participant uses a control to submit the annotation after the participant is finished editing the annotation. In certain embodiments, all participants can edit annotations created by any participant. In certain embodiments, only the creator participant can edit an annotation.

In certain embodiments, a virtual whiteboard 506 is based on a physical whiteboard 504—that is, the virtual whiteboard 506 displayed at each endpoint in the video conference includes a video stream presenting the appearance of the physical whiteboard. In certain embodiments, changes in the appearance of the physical whiteboard are represented in the virtual whiteboard 506 in real time—that is, updates appear at update points occurring every second, or every tenth of a second, or at rates of 1-50 frames per second (fps), such as 5 fps or 30 fps. In certain embodiments, the appearance of the virtual whiteboard 506 or a saved representation of the content of the virtual whiteboard 506 is updated according to natural update points at the physical whiteboard 504 or virtual whiteboard 506. In certain embodiments, a natural update point is a time when the video feed 608 of the physical whiteboard or virtual whiteboard 506 is stable or constant after a period of detected movement or change, for example an absence of changes for 1, 2, 5, or 10 seconds, a minute, or 5 minutes. A natural update point may represent a time at which a participant has temporarily finished writing on or marking up the physical whiteboard 504. An update point may be associated with a snapshot or image representing the appearance of the physical whiteboard stream 608 or the virtual whiteboard 506. In certain embodiments, update points may be associated with a representation of the difference in appearance between the current update point and the previous update point (e.g., the description of the new markings, the new annotation, or an erasure of one or more markings or annotations).

The video or images representing the physical whiteboard appearance in the virtual whiteboard may be referred to as the physical whiteboard stream 608. In FIG. 6, physical whiteboard stream 608 is depicted with a dotted border for the convenience of identifying it in the figure, but in practice physical whiteboard stream 608 is typically not presented with a border. The displayable area of physical whiteboard stream 608 may extend to the full presentation area of virtual whiteboard 506, or the presentation area of virtual whiteboard 506 less a margin. In certain embodiments, camera/projector 502 is used to generate the content for the physical whiteboard stream. For example, a computer, remote server, or camera/projector 502 may generate a rectangular physical whiteboard stream for display via the virtual whiteboard video or series of images by applying a perspective warp and/or noise reduction filter to images or video of the physical whiteboard 504 taken by the camera/projector 502. Generation of the physical whiteboard stream may occur in real time. In certain embodiments, 100% or 90% of the display of physical whiteboard 504, where the physical whiteboard is sized 6 feet by 4 feet or smaller, may be captured by the camera/projector 502. In certain embodiments, the camera/projector 502 is configured with a processor for image analysis, and "noise" such as an image of a human hand captured while writing on the physical whiteboard 504 or other transient images are automatically removed from the image data provided to the videoconferencing system 100. In other embodiments, such noise filtering may be performed by another local device, such as PC 404, or by videoconferencing system 100.

In certain embodiments, the physical whiteboard stream 608 may be represented as an annotation or a layer in the virtual whiteboard 506. Server 108 of video conferencing system 100 may be used to composite the annotations associated with a virtual whiteboard 506 in accordance with their ordering for delivery to each endpoint. For example, the physical whiteboard stream 608 may be presented behind the other annotations that participants (such as endpoints 310*d-g*) have added to the virtual whiteboard, allowing all participants of the video conference to view and share annotations to the virtual whiteboard, for example via user interface 600. For example, a snapshot of physical whiteboard stream 608 showing the physical whiteboard is depicted in FIG. 6, with overlaid annotations 606a (freehand curly bracket), 606b (a rectangle), and 606c (text) added by remote participants at any of endpoints 310e-g.

Physical Whiteboard Content Indexing

In certain embodiments, content represented in the physical whiteboard stream 608 is indexed. Indexing of content in the physical whiteboard stream 608 is based on an automated analysis in which handwritten or hand-drawn objects represented in the physical whiteboard stream 608 or a derivative are recognized and associated with a recognized object definition. The automated analyses may involve optical character recognition (OCR), natural language analysis, or other pattern-recognition algorithms. For example, at certain intervals (e.g., in real-time or at natural update points, or a subset of time points), OCR processing can be applied to the content of the physical whiteboard stream 608. The result of the OCR analysis is a character-based representation of handwritten text on the physical whiteboard, where the characters may be, for example, encoded as ASCII or Unicode characters. In certain embodiments, natural language analysis or pattern-recognition approaches can be used to recognize structured or formatted text—for example, to identify a handwritten bulleted or numbered list or a handwritten title and generate a formatted text representation of the corresponding handwritten material. For example, OCR and/or pattern recognition may be used to transcribe the handwritten text from the physical whiteboard 504 shown in FIG. 6 displayed beneath annotation 606b as "(1) launch v2"—the handwriting may be indexed as a line of text that can be formatted as an item in a numbered list using OCR analysis applied to an image at a time point extracted from physical whiteboard stream 608, such as applying the Tesseract OCR engine to the image.

In certain embodiments, indexing may involve pattern recognition algorithms applied to images extracted from physical whiteboard stream 608, such as using a K-nearest neighbors approach to recognize objects like geometric shapes or lines drawn or written on the physical whiteboard 504. In certain embodiments, areas or regions including printed or handwritten text can be identified by application of a maximally stable extremal regions (MSER) method, because text may be associated with consistent color and high contrast, resulting in a stable intensity profile and may thus be identified as a stable region. Non-text geometric objects may be recognized using a rule-based approach, for example, by applying thresholds to objects based on geometric properties of the objects—e.g., one or more of identifying objects associated with an aspect ratio greater than 3, an eccentricity >0.99, an Euler number less than −4, an extent less than 0.2 or greater than 0.9, or a solidity less than 0.3. In certain embodiments, techniques such as use of a Deep Neural Network (DNN) or another type of neural network may be applied to images associated with the physical whiteboard 504, which can be used to recognize other categories of handwritten or hand-drawn objects. For example, DNN-based pattern recognition may be used to identify a pie chart, or other geometric and complex objects in the images.

Recognized objects may be, for example, text objects, geometric objects, or complex objects. Text objects can be defined using a character-based representation and may additionally include formatting and white space like underlining, introduced tabs, or bullet points. Text objects may be, for example, a block of text, a line of text, a table of text, or a word. Geometric objects can be defined as geometric shapes, for example a circle, a line, an oval, or a triangle. Complex objects can be defined and represented using multiple shapes and parameters, such as a pie chart, a line graph, a diagram, or an arrow. In some embodiments, complex objects may also include text, such as a title or label.

At the conclusion of a video conferencing session, a representation of the virtual whiteboard 506 may be stored as a saved whiteboard object. In certain embodiments, the saved whiteboard object may be stored locally (e.g., within an enterprise or local area network associated with the endpoint 310d in accordance with privacy settings) or may be stored remotely at a server of video conferencing system 100. A saved whiteboard object may include, for example, a slide-deck-based representation of the appearance of the virtual whiteboard 506 at various time points (e.g., certain update points), for example saved as a PDF document or a PowerPoint document. The saved whiteboard object may include, for example, text or RTF documents containing the recognized objects and annotations from the physical whiteboard stream 608 or virtual whiteboard 506 of the video conference session, audio, and/or video recordings of the session.

In certain embodiments, indexed material may be included in the saved whiteboard object. The indexing may be performed locally (e.g., at PC 404 of a room system 402), or in certain embodiments, indexing is performed at a server of video conferencing system 100. In certain embodiments, the indexed materials are made available and searchable via a database. In certain embodiments, an indexing analysis is performed after completion of the video conferencing session, based on a saved whiteboard object or a component of the saved whiteboard object. In certain embodiments, indexing occurs in real time, or during the progression of the video conferencing session.

In certain embodiments, recognized objects (e.g., recognized blocks of text or geometric objects) are associated with a time point at which they were introduced to the virtual whiteboard 506. In certain embodiments, recognized objects are saved to an index file that may be a component of the saved whiteboard object. Such an index file may include the first instance of each recognized object along with the time point or time points at which the object was created during the video conference session. In certain embodiments, the index file may be represented as a slide deck. In certain embodiments, the index file may comprise a listing of the unique recognized objects that were extracted from the physical whiteboard stream. In certain embodiments, the unique recognized objects may be the non-overlapping, different recognized objects identified during or after the video conference. In certain embodiments, an index file may serve as a guide associating the recognized objects with time points in a recording of the virtual whiteboard video conference session. In certain embodiments, a saved whiteboard object may include an audiorecording and/or an automated transcript of the audio for the virtual whiteboard video conference session.

A saved whiteboard object may be updated or augmented based on the indexing. For example, handwritten objects in the physical whiteboard stream 608 may be recognized/ identified and represented as digitally formatted objects: e.g., a handwritten bulleted list identified in the physical whiteboard stream 608 may be represented in a component of the saved whiteboard object (e.g., a slideshow based on the video conference session) using a font and digital formatting, or a handwritten circle in the physical whiteboard stream 608 may be represented as a perfect circle shape, e.g. defined by a diameter or radius and a stroke width centered at a location within the virtual whiteboard 506 presentation area. In certain embodiments, the virtual whiteboard 506 may be updated during the video conference to present one or more recognized objects in place of the corresponding content in the physical whiteboard stream 608.

In certain embodiments, upon conclusion of the virtual whiteboard video conferencing session, the video conferencing system 100 sends to each participant meeting notes including slides corresponding to the whiteboard appearance at various time points (e.g., certain update points), and including embedded recognized/indexed content from the physical whiteboard stream 608. In certain embodiments, the embedded indexed content permits the notes to be searched using text queries. In certain embodiments, the meeting notes comprise the index file. The meeting notes may be included in a searchable database.

Projector Feedback with Digital Coalescing

Figure 7:
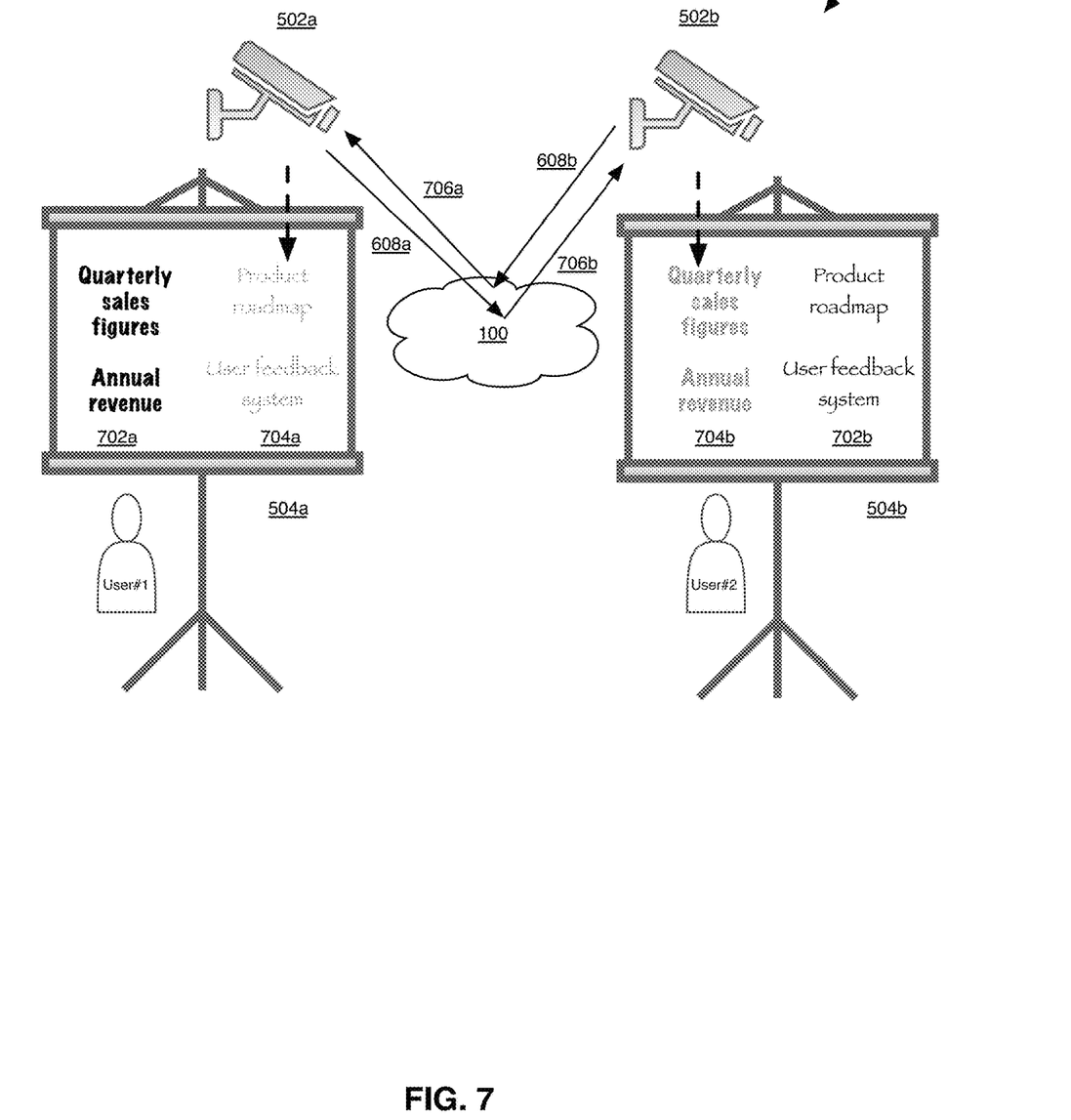
FIG. 7 depicts an embodiment of an exemplary video conferencing system in accordance with some embodiments of the invention.

FIG. 7 shows an embodiment of exemplary video conferencing system 700, illustrating an exemplary video conference in which markings are shared between two or more physical whiteboards. In this embodiment, a first user/participant is located at a first endpoint associated with physical whiteboard 504a and camera/projector 502a. A second user/participant is located at a second endpoint associated with physical whiteboard 504b and camera/projector 502b. The two endpoints are participating in a video conference supported by video conferencing system 100. In certain embodiments, as shown in FIG. 7, markings on physical whiteboard 504a (e.g., physical markings 702a) are projected onto other whiteboards associated with the video conference (here, shown as projected markings 704b, projected via associated camera/projector 502b as part of a first projector stream that has been composited for physical whiteboard 504b). Conversely, markings on physical whiteboard 504b (physical markings 702b) are projected onto other whiteboards associated with the video conference (here, shown as projected markings 704a on physical whiteboard 504a, projected via associated camera/projector 502a as part of a second projector stream that has been composited for physical whiteboard 504a).

Accordingly, as shown in FIG. 7, in the circumstances involving two physical whiteboards 504, the camera functionality of camera/projector 502a is used to generate the image or video data for physical whiteboard stream 608a. Projector stream 706b, projected by camera/projector 502b, is based on physical whiteboard stream 608a. Conversely, physical whiteboard stream 608b is based on the image or video data of physical whiteboard 504b, and projector stream 706a is based on physical whiteboard stream 608b. In certain embodiments, a video endpoint associated with the video conference would view a virtual whiteboard 506 showing a composite of the two physical whiteboard streams, as well as digital annotations if appropriate.

In certain embodiments of system 700, markings from three or more physical whiteboards may be shared, as well as digital annotations from additional endpoints (e.g., as described in connection with FIGS. 5 and 6). Digital annotations would be projected onto each physical whiteboard 504 via an associated camera/projector 502. Updates to the annotations (including other physical whiteboard streams 608) may be projected to endpoint physical whiteboards 504 in real time.

In certain embodiments, if physical markings 702 are recognized as text (e.g., using OCR), the equivalent text is rendered using a font and projected onto other whiteboards (for example, physical whiteboards 504 or virtual whiteboards 506). In certain embodiments, only recognized text objects (and, in some embodiments, digital annotations) are provided to other physical whiteboards 504, and physical whiteboard streams 608 from remote physical whiteboards are not projected onto local physical whiteboards.

In the context of system 700, "remotely sourced" indicates visual objects created by a means other than physically writing on the respective local physical whiteboard 504—e.g., in one embodiment, a laptop-user participant situated in the same room as the whiteboard may generate a remotely sourced visual object by digitally annotating a virtual whiteboard 506 associated with the video conference.

In certain embodiments, system 700 may be implemented by designating a first region of each physical whiteboard 504 for local physical whiteboard markings, and a separate second region for remotely sourced visual object projection, and associating the physical markings 702 in the first region as having a local source and projected markings 704 in the second region as having a remote source. See, e.g., exemplary physical whiteboards 504a,b shown in FIG. 7, where local markings (702a,b) occur in different regions of the respective whiteboards compared to projected markings (704a,b). Alternatively, camera/projector 504 or system 700 may intelligently (e.g., based on configurable rules) designate a certain horizontal or vertical portion of physical whiteboard 504 for writing/physical markings, and camera/projector 504 may accordingly project a horizontal or vertical line (or a box) as appropriate to designate the border of a designated writing area. In such an embodiment, anything written outside of the designated writing area (1) will not be photographed or (2) will be filtered out of the physical whiteboard stream based on that physical whiteboard 504. In such an embodiment, remotely sourced visual data may be projected to a region other than the designated writing area.

In certain alternative embodiments, system 700 may be implemented by digitally processing one or more physical whiteboard streams from a first endpoint, e.g., at a point of presence, to remove projector stream content captured by a camera from the stream to be provided to a second endpoint associated with a projector and whiteboard. For example, the local physical markings may be treated as a local layer, and projected material may be treated as a remote layer. The remote layer is a composed feed of all remote sources, such as other physical whiteboard(s) 504 and digital annotations coming from system 100. For example, the remote layer may be a virtual whiteboard 506, less the local layer. In certain embodiments, a processor such as the processor of camera/projector 502, PC 404, or a server of system 100 may keep a copy of the remote layer in memory sent from the projector. When the camera captures an image which includes image data associated with both the remote layer and the local layer, then the processor uses pixel subtraction to retrieve the current local layer. (For example, captured image=Remote Layer+Local Layer; Current Local Layer=Capture−Copy of Remote Layer.)

In certain alternative embodiments, the arrangement of system 700 may be implemented using a virtual whiteboard 506. For example, a virtual whiteboard 506 may be used to track the source and ordering of each visual object collectively displayed in the video conference in order to formulate a respective projector stream that appropriately projects only the remotely sourced visual objects (e.g., annotations and physical whiteboard streams) on the respective physical whiteboards 504.

Figure 8:
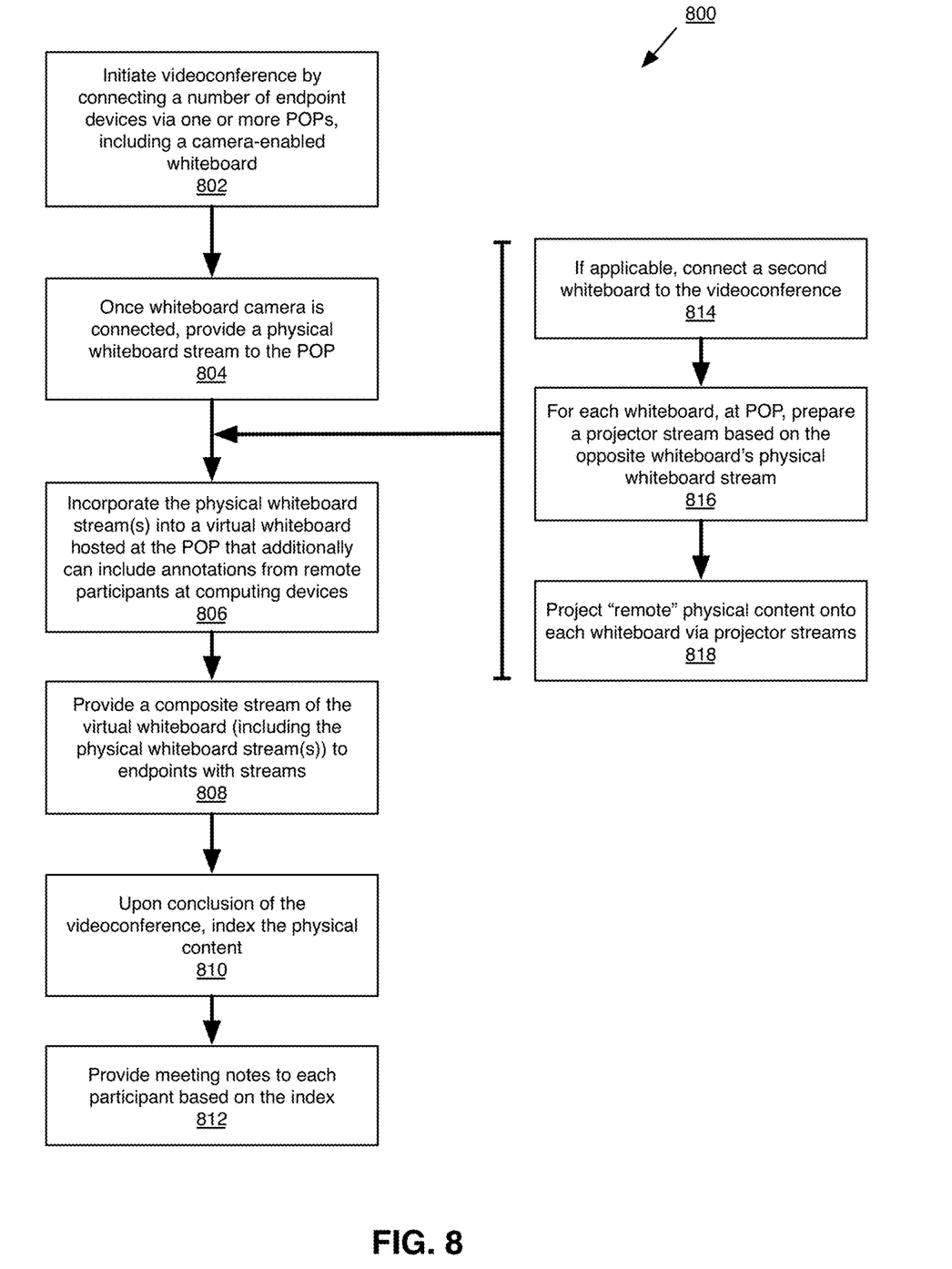
FIG. 8 shows a flow chart for an exemplary process concerning providing a teleconference involving whiteboards in accordance with some embodiments of the invention.

FIG. 8 shows a flow chart for an exemplary process 800 concerning providing a teleconference involving whiteboards. Any step of process 800 may be automated. In the first step, the video conference is initiated by connecting the participant endpoint devices (e.g., laptops, room systems) to one or more POPs (802). In example process 800, at least one endpoint is associated with a whiteboard associated with a camera for taking images and/or video. The camera is used to provide data for a physical whiteboard stream 608 to the POP (804). In certain embodiments, the camera directly communicates with the POP, providing a series of images or video. In certain embodiments, the camera provides image or video data to a local computing device (e.g., PC 404), and that computing device provides the image or video data to the POP. In certain embodiments, the computing device generates the physical whiteboard stream 608, and in other embodiments, the image or video data is processed to generate the physical whiteboard stream 608 at the POP.

Continuing with process 800, the physical whiteboard stream 608 is incorporated into a virtual whiteboard 506 (806). The virtual whiteboard may be used to incorporate additional elements into a whiteboard-related feed, such as annotations 606, or other physical whiteboard streams 608 (e.g., as described below in connection with steps 814, 816, and 818). The POP will composite the various elements of the virtual whiteboard stream (i.e., a stream representation of the virtual whiteboard), applying filters to show and hide elements if necessary, and will provide the whiteboard-related feed as a composite stream to endpoints with digital screens for display in a user interface, such as user interface 600 (808). Additional video streams, for example streams depicting participants, may be provided to endpoint devices and presented in the user interface as appropriate (e.g., alongside the stream of the virtual whiteboard).

In example process 800, the content from the physical whiteboard stream(s) 608 are indexed upon the conclusion of the video conference (810). In certain embodiments, the video conference is indexed during the session, or is not indexed at all. In certain embodiments, annotations are incorporated into the indexing as well. In a final step, the recognized objects (e.g., the result of the indexing) are used to generate meeting notes, which may be, for example, a slide presentation showing a series of recognized objects (812). In certain embodiments, the meeting notes may also include images of handwritten or hand-drawn items that were not identified as recognized objects. The meeting notes may associate the slides or recognized objects with respective time stamps based on the times they were introduced during the video conference. The meeting notes may then be provided to each participant associated with the video conference, for example via email. In certain embodiments, the results of the indexing are saved into a searchable database, in addition to or instead of providing meeting notes to the participants.

In one possible version of process 800, a second whiteboard is associated with the video conference in order to share content to the physical whiteboards as well as the virtual whiteboard (814). In this circumstance, the whiteboards should each be equipped with projectors as well as cameras. The projectors may be separate from the cameras. If the projectors and cameras are separate devices, they should each have a data connection to a computing device or to the POP, and if they are implemented as a single camera/projector device 502, the device should have such a data connection. Both the camera and projector should be focused on the associated whiteboard. Using the physical whiteboard stream 608, the POP will create a respective projector stream 706 for projecting to each whiteboard (816). In certain embodiments, more than two physical whiteboards are associated with the video conference, and each projector stream represents a composite of the other whiteboards. In certain embodiments, the virtual whiteboard 506 represents the aggregate of all physical whiteboard content and annotations, and the projector stream for a particular whiteboard will incorporate all displayable elements of the virtual whiteboard less the elements of the particular whiteboard's physical whiteboard stream 608. Stated another way, the projector stream may include all remote whiteboard-associated content. Each projector stream 706 should be projected onto the corresponding physical whiteboard 504 (818).

FIG. 9 is a block diagram showing an exemplary computing system 900 that is representative any of the computer systems or electronic devices discussed herein. Note that not all of the various computer systems have all of the features of system 900. For example, systems may not include a display inasmuch as the display function may be provided by a client computer communicatively coupled to the computer system or a display function may be unnecessary.

System 900 includes a bus 2506 or other communication mechanism for communicating information, and a processor 2504 coupled with the bus 2506 for processing information. Computer system 900 also includes a main memory 2502, such as a random access memory or other dynamic storage device, coupled to the bus 2506 for storing information and instructions to be executed by processor 2504. Main memory 2502 also may be used for storing temporary variables or other intermediate information during execution of instructions to be executed by processor 2504.

System 900 includes a read only memory 2508 or other static storage device coupled to the bus 2506 for storing static information and instructions for the processor 2504. A storage device 2510, which may be one or more of a hard disk, flash memory-based storage medium, magnetic tape or other magnetic storage medium, a compact disc (CD)-ROM, a digital versatile disk (DVD)-ROM, or other optical storage medium, or any other storage medium from which processor 2504 can read, is provided and coupled to the bus 2506 for storing information and instructions (e.g., operating systems, applications programs and the like).

Computer system 900 may be coupled via the bus 2506 to a display 2512 for displaying information to a computer user. An input device such as keyboard 2514, mouse 2516, or other input devices 2518 may be coupled to the bus 2506 for communicating information and command selections to the processor 2504. Communications/network components 2520 may include a network adapter (e.g., Ethernet card), cellular radio, Bluetooth radio, NFC radio, GPS receiver, and antennas used by each for communicating data over various networks, such as a telecommunications network or LAN.

The processes referred to herein may be implemented by processor 2504 executing appropriate sequences of computer-readable instructions contained in main memory 2502. Such instructions may be read into main memory 2502 from another computer-readable medium, such as storage device 2510, and execution of the sequences of instructions contained in the main memory 2502 causes the processor 2504 to perform the associated actions. In alternative embodiments, hard-wired circuitry or firmware-controlled processing units (e.g., field programmable gate arrays) may be used in place of or in combination with processor 2504 and its associated computer software instructions to implement the invention. The computer-readable instructions may be rendered in any computer language including, without limitation, Python, Objective C, C#, C/C++, Java, Javascript, assembly language, markup languages (e.g., HTML, XML), and the like. In general, all of the aforementioned terms are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 900 or similar electronic computing device, that manipulates and transforms data represented as physical (electronic) quantities within its registers and memories into other data similarly represented as physical quantities within its memories or registers or other such information storage, transmission or display devices.

While the preferred embodiments have been shown and described, it will be understood that there is no intent to limit the invention by such disclosure, but rather, is intended to cover all modifications and alternate constructions falling within the spirit and scope of the invention.

What is claimed is:

1. A method, comprising:
accepting, at a point of presence, from a plurality of participants to a video conference, a plurality of audio and video streams from a plurality of video-conference endpoints, each video-conference endpoint associated with at least one respective participant of the plurality of participants;
accepting, at the point of presence, a first physical-whiteboard stream generated based on a sequence of images of a first region designated as a writing area of a first physical whiteboard;
enabling, at the point of presence, a virtual whiteboard comprising the first physical-whiteboard stream;
providing a representation of the appearance of the virtual whiteboard as a virtual-whiteboard stream to the plurality of video conference endpoints;
providing a first projector stream based on remotely sourced visual data to a first projector endpoint associated with the first physical whiteboard; and
projecting the first projector stream on a second region of the first physical whiteboard for remotely sourced visual data, wherein the first region of the first physical whiteboard is separate from the second region of the first physical whiteboard to enable simultaneous viewing of local markings in the first region and projected markings in the second region.

2. A system, comprising:
a processor;
a storage device communicatively coupled to the processor; and
instructions stored on the storage device that, when executed by the processor, cause the processor to:
accept, at a point of presence, from a plurality of participants to a video conference, a plurality of audio and video streams from a plurality of video-conference endpoints, each video-conference endpoint associated with at least one respective participant of the plurality of participants;
accept, at the point of presence, a first physical-whiteboard stream generated based on a sequence of images of a first region designated as a writing area of the first physical whiteboard;
enable, at the point of presence, a virtual whiteboard comprising the first physical-whiteboard stream;
provide a representation of the appearance of the virtual whiteboard as a virtual-whiteboard stream to the plurality of video conference endpoints; and
provide a first projector stream based on remotely sourced visual data to a first projector endpoint associated with the first physical whiteboard, for projection on a second region of the first physical whiteboard for remotely sourced visual data, wherein the first region of the first physical whiteboard is separate from the second region of the first physical whiteboard to enable simultaneous viewing of local markings in the first region and projected markings in the second region.

3. The method of claim 1, further comprising projecting a line to designate a border of the writing area of the first physical whiteboard onto the first physical whiteboard, the line separating the first region of the first physical whiteboard from the second region of the first physical whiteboard.

4. The method of claim 1, wherein the first projector stream comprises at least one video stream from the plurality of audio and video streams from the plurality of video-conference endpoints.

5. The system of claim 2, wherein the first projector stream comprises at least one video stream from the plurality of audio and video streams from the plurality of video-conference endpoints.

6. A method, comprising:
accepting, at a point of presence, from a plurality of participants to a video conference, a plurality of audio and video streams from a plurality of video-conference endpoints, each video-conference endpoint associated with at least one respective participant of the plurality of participants;
accepting, at the point of presence, a first physical-whiteboard stream generated based on a sequence of images of a first physical whiteboard;
enabling, at the point of presence, a virtual whiteboard comprising the first physical-whiteboard stream;
providing a representation of the appearance of the virtual whiteboard as a virtual-whiteboard stream to the plurality of video conference endpoints;
providing a first projector stream to a first projector endpoint associated with the first physical whiteboard, wherein the first projector stream represents remotely sourced visual data; and
projecting the first projector stream on the first physical whiteboard,
wherein the first physical-whiteboard stream excludes representations of remotely sourced visual content and is generated by performing a pixel-wise subtraction of the first projector stream from the sequence of images of the first physical whiteboard.

7. The system of claim 6, wherein the first projector stream comprises at least one video stream from the plurality of audio and video streams from the plurality of video-conference endpoints.

* * * * *